United States Patent
Lin et al.

(10) Patent No.: US 9,221,121 B2
(45) Date of Patent: Dec. 29, 2015

(54) WELDING PROCESS FOR WELDING THREE ELEMENTS USING TWO ANGLED ENERGY BEAMS

(71) Applicant: GENERAL ELECTRIC COMPANY, Schenectady, NY (US)

(72) Inventors: Dechao Lin, Greer, SC (US); Zhaoli Hu, Greer, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 13/851,268

(22) Filed: Mar. 27, 2013

(65) Prior Publication Data
US 2014/0294490 A1    Oct. 2, 2014

(51) Int. Cl.
B23K 26/24    (2014.01)
B23K 15/00    (2006.01)
B23K 10/02    (2006.01)
B23K 26/02    (2014.01)
(Continued)

(52) U.S. Cl.
CPC ............. *B23K 26/026* (2013.01); *B23K 10/02* (2013.01); *B23K 15/004* (2013.01); *B23K 15/0013* (2013.01); *B23K 15/0053* (2013.01); *B23K 26/0604* (2013.01); *B23K 26/0676* (2013.01); *B23K 26/243* (2013.01); *B23K 2201/001* (2013.01); *B23K 2201/14* (2013.01); *Y10T 403/478* (2015.01)

(58) Field of Classification Search
CPC ............. B23K 26/026; B23K 26/0604; B23K 26/243; B23K 26/0869; B23K 26/0876; B23K 26/0884; B23K 10/02; B23K 15/0013; B23K 15/0053

USPC .................................................... 219/121.64
See application file for complete search history.

(56) References Cited

U.S. PATENT DOCUMENTS 4,258,247 A * 3/1981 Shimada et al. .......... 219/137 R
5,001,324 A    3/1991 Aiello et al.
(Continued)

FOREIGN PATENT DOCUMENTS

JP        61-229489 A  * 10/1986
JP        2005-21912 A *  1/2005
JP        2011-56571 A *  3/2011

OTHER PUBLICATIONS

Machine translation of Japan Patent Document No. 2011-56,571, Oct. 2014.*

*Primary Examiner* — Geoffrey S Evans
(74) *Attorney, Agent, or Firm* — McNees Wallace & Nurick LLC

(57) ABSTRACT

A welding process, welding system and welded article are disclosed. The welding process includes directing energy from one or more fusion beams to join a first element to a second element and to join the first element to a third element. The directing of the energy is at a first lateral angle and a second lateral angle with respect to the first element. The welding system includes an energy emitting device, a first fusion beam and a second fusion beam. The first fusion beam and the second fusion beam are oriented to extend diagonally through an article. The laser welded article includes the first element joined to the second element, and the first element joined to the third element. A fillet weld is formed in a first inaccessible portion between the first element and the second element and a second inaccessible portion between the first element and the third element.

14 Claims, 4 Drawing Sheets

(51) Int. Cl.
  *B23K 26/06* (2014.01)
  *B23K 26/067* (2006.01)

(56) References Cited

U.S. PATENT DOCUMENTS

| | | | |
|---|---|---|---|
| 5,155,323 A | | 10/1992 | Macken |
| 5,483,034 A | * | 1/1996 | Havard et al. ............ 219/121.64 |
| 2004/0149700 A1 | * | 8/2004 | Bayer et al. .............. 219/121.46 |
| 2006/0102597 A1 | * | 5/2006 | Brown et al. ............. 219/121.14 |
| 2006/0255019 A1 | * | 11/2006 | Martukanitz et al. .... 219/121.64 |
| 2008/0029498 A1 | | 2/2008 | Forrest et al. |
| 2008/0257870 A1 | * | 10/2008 | Longfield et al. ........ 219/121.64 |
| 2009/0242523 A1 | * | 10/2009 | Nakamae et al. ......... 219/121.64 |
| 2010/0213179 A1 | * | 8/2010 | Peters ...................... 219/121.64 |

\* cited by examiner

WELDING PROCESS FOR WELDING THREE ELEMENTS USING TWO ANGLED ENERGY BEAMS

FIELD OF THE INVENTION

The present invention is directed to welding processes, welding systems and welded articles. More specifically, the present invention is directed to fusion welding.

BACKGROUND OF THE INVENTION

Welding is a continuously developing technology used to join multiple materials together to form a joined article. Welded articles are continuously being made smaller, while consistently being subjected to increasingly harsh conditions. Often, due to an article's shape and/or size, a weld is desired in a location that is inaccessible to a welding apparatus. Known techniques attempt to address these demands but are not able to adequately meet them.

One known welding process uses a single laser beam directed at an article to weld materials together. The single laser beam is directed straight into a first material which is positioned between a second material and a third material. The energy from the laser beam creates a weld between the first material and the second material. The energy from the laser beam also creates a weld between the first material and the third material. The single laser beam does not exit the first element, which can result in a build-up of heat, but does not create fillets between the first element and the second and third elements, which prevents improvement of structural integrity.

Another known welding process uses tungsten inert gas (TIG) welding. TIG welding involves manually feeding a weld material to a desired weld location and applying heat. TIG welding requires a user to control the size and density of a weld region as the welding is occurring. TIG welding also requires a significant amount of heat to be applied during the welding process. The heat and inherent variability due to user control often result in distortion of the material being welded, inconsistent welds, low productivity, or combinations thereof. In addition, access to a region to be welded can be required.

A welding process, welding system and welded article not suffering from one or more of the above drawbacks would be desirable in the art.

BRIEF DESCRIPTION OF THE INVENTION

In an exemplary embodiment, a welding process includes directing energy from one or more fusion beams to join a first element to a second element and to join the first element to a third element separately or simultaneously. The directing of the energy is at a first lateral angle and a second lateral angle with respect to the first element.

In another exemplary embodiment, a welding system includes an energy emitting device, a first fusion beam and a second fusion beam. The first fusion beam and the second fusion beam are oriented to extend diagonally through an article.

In another exemplary embodiment, a laser welded article includes a first element positioned between a second element and a third element. The first element is joined to the second element, and the first element is joined to the third element. A fillet weld is formed in a first inaccessible portion between the first element and the second element, and in a second inaccessible portion between the first element and the third element.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary welding process, welding system and welded article. Embodiments of the present disclosure, in comparison to methods and products not utilizing one or more features disclosed herein, reduce or eliminate distortion, increase consistency, increase productivity, reduce or eliminate defects, create multiple desired fillets, prevent fusion beams from building up energy and/or heat only in the first element of a weld region, or a combination thereof. Defects include, but are not limited to, porosity, lack of fusion between elements, or a combination thereof.

Figure 1:
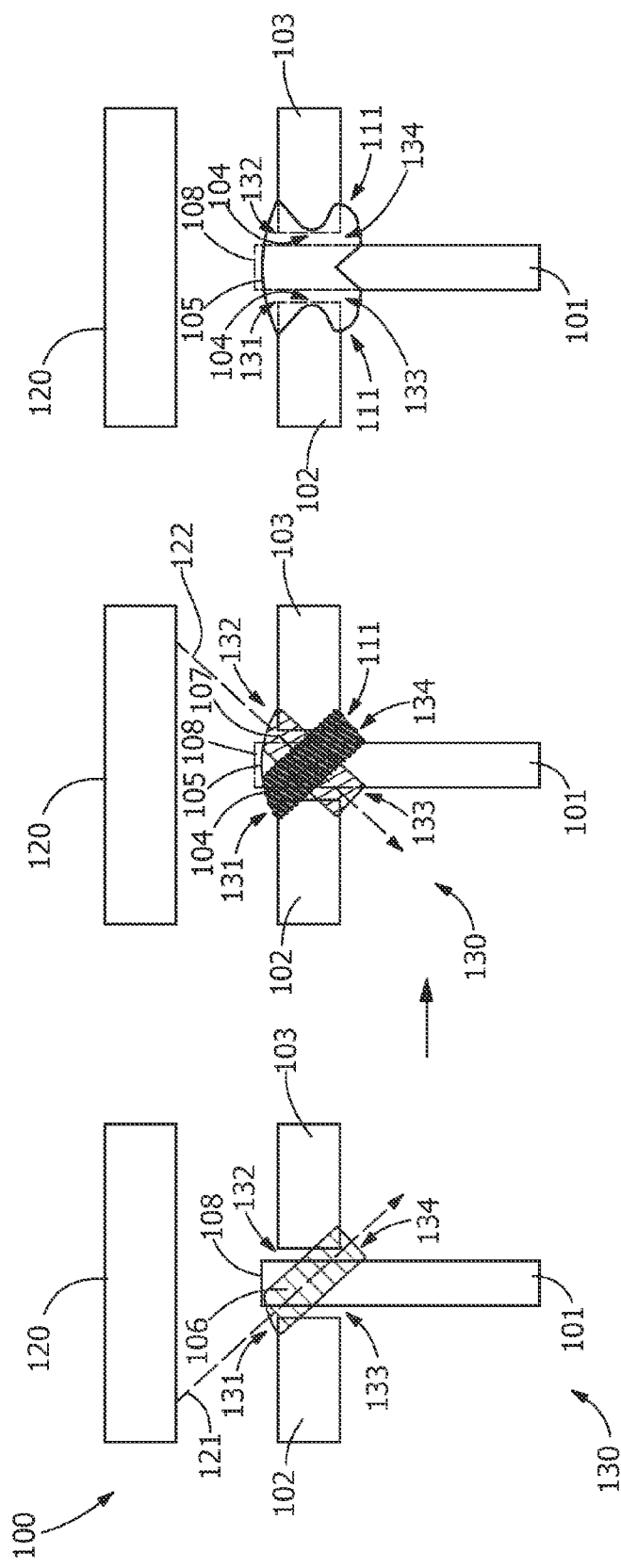
FIG. 1 is a schematic view of an exemplary welding process producing an exemplary welded article using two fusion beams according to the disclosure.

Referring to FIG. 1, in one embodiment, a welding process 100 includes positioning a first element 101. For example, the first element 101 is positioned by hand, perpendicularly or angularly to one or more other materials, mechanically secured in place prior to the first element 101 being positioned, mechanically secured in place prior to placement of the one or more other materials, through other suitable techniques, or a combination thereof.

Figure 4:
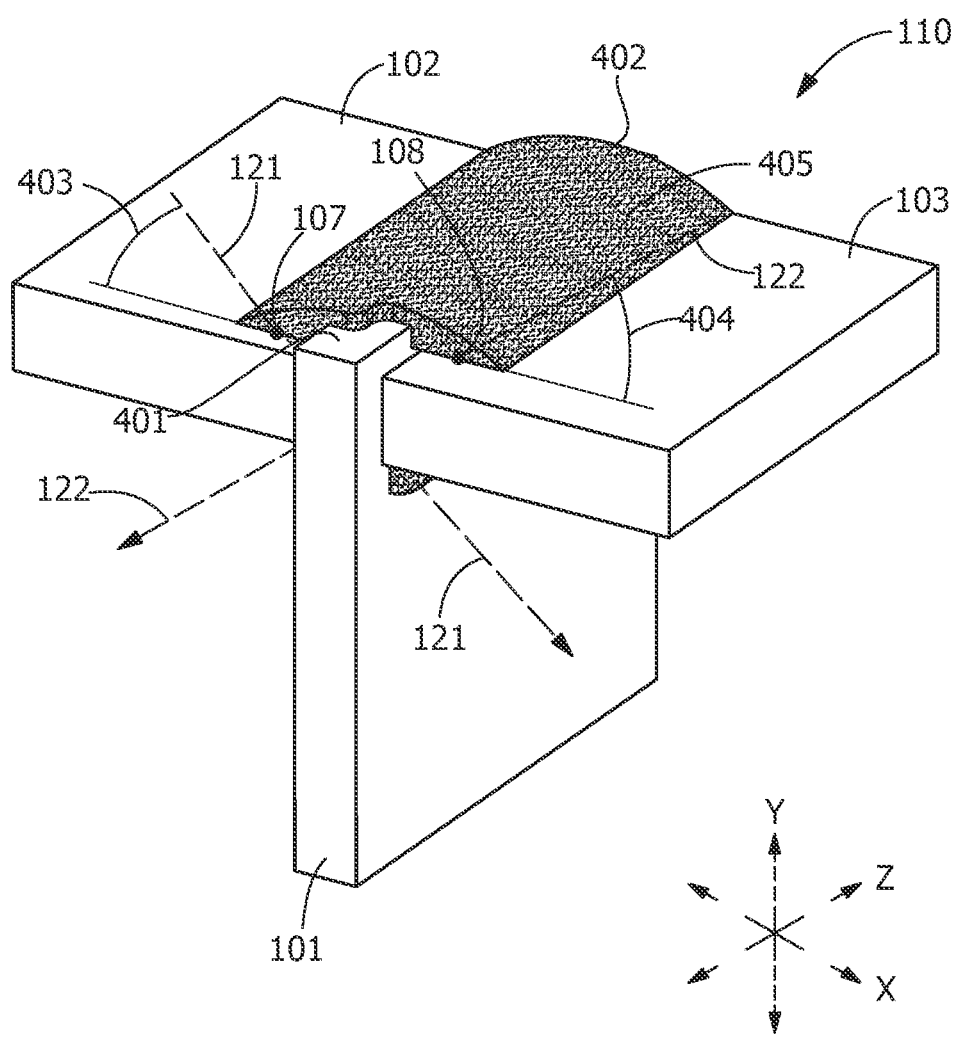
FIG. 4 is a perspective view of an article being welded according to the disclosure.

The first element 101 is any part, such as, a sheet, a member, a plate, a tube, an extrusion, and/or a protrusion, or any other portion of any suitable component or assembly. Suitable components include, but are not limited to, blades, buckets, shrouds, turbine engine components, other turbine components, or a combination thereof. Other suitable components include, but are not limited to, tube-to-plate heat exchangers, heat transfer devices, other heating/ventilation/air conditioning components, or combinations thereof. In one embodiment, the first element 101 is positioned intermediate to a second element 102 and a third element 103, such that the first element 101 extends from between the second element 102 and the third element 103. The first element 101, the second element 102, and/or the third element 103 are portions of one or more systems or components or are portions of separate components and are similar or different structures. As is shown in FIG. 4, in one embodiment, the first element 101 is in a "y" plane, the second element 102 and the third element 103 are in an "x" plane, and the welding process 100 progresses in a "z" plane, the "z" plane being perpendicular to the "x" plane and the "y" plane.

The first element 101, the second element 102, and the third element 103 have any suitable thickness(es). Suitable thicknesses include, but are not limited to, between about 0.01 micrometers and about 10 micrometers, between about 0.1 micrometers and about 10 micrometers, between about 1 micrometer and about 10 micrometers, between about 5 micrometers and about 10 micrometers, between about 0.1 micrometers and about 5 micrometers, between about 1 micrometer and about 5 micrometers, or any suitable combination, sub-combination, range, or sub-range thereof.

The first element 101, the second element 102, and the third element 103 are any suitable weldable material(s). The first element 101 includes a first material. The second element 102 includes a second material. The third element 103 includes a third material. The composition of the first material differs from or is the same as the second material. The composition of the second material differs from or is the same as the third material. The composition of the first material differs from or is the same as the third material. Suitable weldable materials include nickel-based alloys, iron-based alloys, cobalt-based alloys, and stainless steel.

Referring again to FIG. 1, after positioning the first element 101, the process 100 continues with energy being directed (step 130) to the first element 101 from an energy emitting device 120. The energy is one or more fusion beams, such as, laser beams, electron beams, hybrid beams, plasma beams, or a combination thereof. The beams are defocused or focused. The energy emitting device 120 is any suitable fusion welding energy source. Suitable fusion welding sources include, but not limited to, a laser welding apparatus, an electron beam welding apparatus, a plasma/arc welding apparatus, any other suitable beam welding, or a combination thereof.

Figure 2:
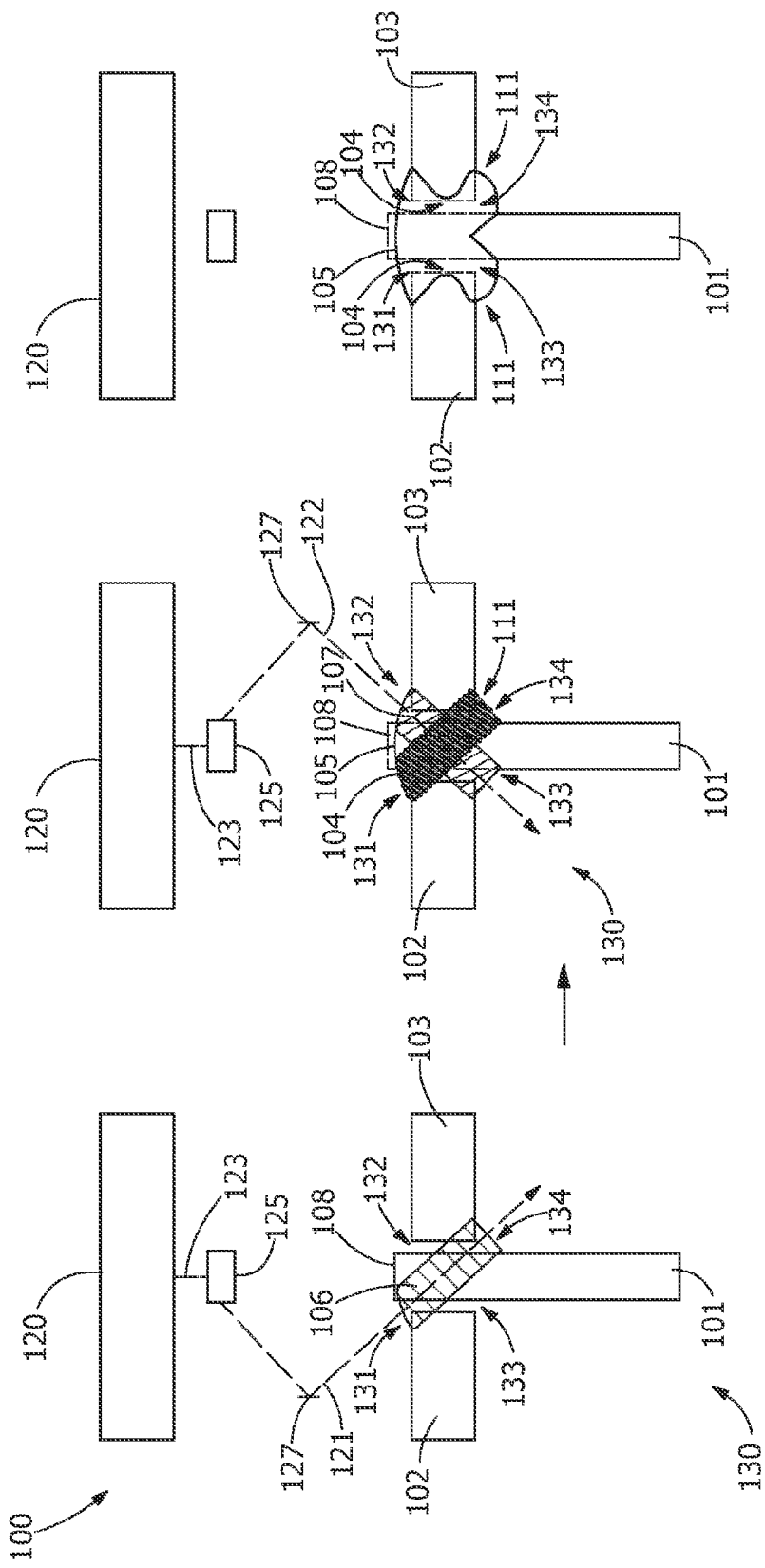
FIG. 2 is a schematic view of an exemplary welding process producing an exemplary welded article using a split fusion beam according to the disclosure.

In one embodiment, the energy is directed (step 130) from the energy emitting device 120 towards an overlap region 104 positioned between the first element 101 and the second element 102 and/or positioned between the first element 101 and the third element 103. The energy is directed (step 130) in a plurality of beams as is shown in FIG. 1, a defocused beam (not shown), or a single fusion beam 123 split by a splitting apparatus 125 directed outwardly from the splitting apparatus 125 and redirected by reflecting devices 127 as is shown in FIG. 2.

Referring to FIG. 1, in one embodiment, the energy from the energy emitting device 120 travels along a first fusion beam path 121. The first fusion beam path 121 extends through and fully penetrates at least a portion of the first element 101. The first fusion beam path 121 extends through the first element 101 from a first side, such as a first accessible portion 131 proximal to the second element 102, and the energy emitting device 120 to a second side, such as a second inaccessible portion 134 proximal to the third element 103 and distal from the energy emitting device 120. The directing of the energy (step 130) in the first fusion beam path 121 creates a first molten pool 106. In one embodiment, the first molten pool 106 cools and solidifies from the second inaccessible portion 134 distal from the energy emitting device 120 toward the first accessible portion 131 proximal to the energy emitting device 120, forming a portion of a fusion region 105 as it cools.

In another embodiment, the energy from the energy emitting device 120 travels along a second fusion beam path 122. The second fusion beam path 122 extend through and fully penetrate at least a portion of the first element 101. The second fusion beam path 122 extends through the first element 101 from the first side, such as a second accessible portion 132 proximal to the third element 103, and the energy emitting device 120 to the second side, such as a first inaccessible portion 133 proximal to the second element 102 and distal from the energy emitting device 120. The directing of the energy (step 130) in the second fusion beam path 122 creates a second molten pool 107. In one embodiment, the second molten pool 107 passes through the fusion region 105 formed by the cooling of the first molten pool 106. The second molten pool 107 cools and solidifies from the first inaccessible portion 133 distal from the energy emitting device 120 toward the second accessible portion 132 proximal to the energy emitting device 120, forming a portion of the fusion region 105 as it cools.

In one embodiment, the first molten pool 106 and the second molten pool 107 form a shared molten pool. Together, the cooling and solidifying of the first molten pool 106 and the second molten pool 107 form the fusion region 105.

One or more fillets 111 form from the molten pool. The fillets 111 are positioned in the overlap region 104 distal from the energy emitting device 120 corresponding with the first inaccessible portion 133 and the second inaccessible portion 134 of the first element 101. In one embodiment, the first fusion beam path 121 and the second fusion beam path 122 create similar and/or equal fillet welds in the first inaccessible portions 133 and the second inaccessible portion 134. In a further embodiment, the fillets 111 are formed simultaneously. In one embodiment, size of the fillet(s) 111 is adjusted using the defocused laser beam and/or a rotary laser.

Upon directing the energy (step 130), the process 100 continues with the welding process 100 of a fusion region 105, defined by the first fusion beam path 121 and the second fusion beam path 122 and/or the overlap region 104. The welding process 100 joins the second element 102 to the first element 101 and joins the third element 103 to the first element 101, forming a welded article 110. A protruding portion 108 of the first element 101 extends from between the second element 102 and the third element 103, proximal to the energy emitting device 120. The protruding portion 108 is consumed by the forming of the first molten pool 106 and the second molten pool 107 such that the welded article 110 is devoid of the protruding portion 108 and/or material from the protruding portion 108 forms the fusion region 105.

In one embodiment, the welding process 100 is an automated process. In a further embodiment, the welding process 100 is completed in a single weld run. The welding process 100 is with any suitable parameters, for example, within any suitable predetermined rate range and/or within any suitable predetermined power range. Suitable rates for the welding process 100 include between about 40 inches per minute and about 80 inches per minute, between about 40 inches per minute and about 70 inches per minute, between about 50 inches per minute and about 80 inches per minute between about 50 inches per minute and about 70 inches per minute, or any suitable combination, sub-combination, range, or sub-range thereof. Suitable power for the welding process 100 includes between about 2 kilowatts and about 10 kilowatts, between about 2 kilowatts and about 8 kilowatts, between about 3 kilowatts and about 4 kilowatts, or any suitable combination, sub-combination, range, or sub-range thereof.

Figure 3:
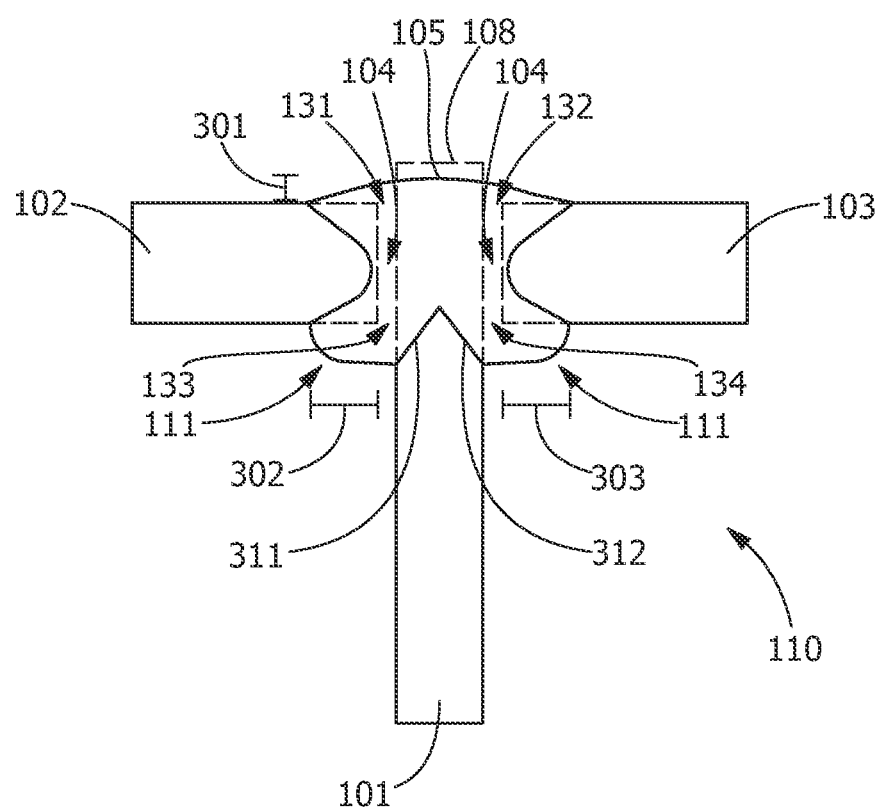
FIG. 3 is a cross-section view of an exemplary welded article according to the disclosure.

Referring to FIG. 3, in one embodiment, the welded article 110 includes the fusion region 105 covering a weld reinforcement region 301 extending from the first element 101, a first width 302 region extending toward the second element 102 from the first element 101 and a second width 303 extending toward the third element 103 from the first element 101. The fusion region 105 joins together the first element 101, the second element 102 and the third element 103. In one embodiment, the fusion region 105 extends to include, and is continuous with, the fillets 111. The fillets 111 are located in the first inaccessible portions 133 and the second inaccessible portion 134 of the fusion region 105.

In one embodiment, the fusion region 105 extends away from the first element 101 between the first accessible portion 131 and the second accessible portion 132, forming a convex geometry. Along the second element 102, the fusion region 105 extends away from the first element 101 at the first accessible portion 131 and at the first inaccessible portion 133. The fusion region 105 forms a concave geometry between the first accessible portion 131 and the first inaccessible portion 133. Along the third element 103, the fusion region 105 extends away from the first element 101 at the second accessible portion 132 and at the second inaccessible portion 134. The fusion region 105 forms a concave geometry between accessible portion 132 and inaccessible portion 134. An inner section 311 and an inner section 312 meet to form a concave geometry between the fillets 111.

Referring to FIG. 4, in one embodiment, the first fusion beam path 121 extends through a first fusion beam entry point 107 at a first lateral angle 403, and the second fusion beam path 122 extends through a second fusion beam entry point 108 at a second lateral angle 404. As used herein, the term "lateral angle" refers to an angle within a plane perpendicular or substantially perpendicular to an intended direction of a weld path 405. The first fusion beam entry point 107, and the second fusion beam entry point 108 are in the first accessible portion 131 and the second accessible portion 132, respectively. The first lateral angle 403 and/or the second lateral angle 404 have any suitable values, for example, between about 1 degree and about 89 degrees, between about 30 degrees and about 60 degrees between about 45 degrees and about 75 degrees, between about 45 degrees and about 60 degrees, or any suitable combination, sub-combination, range, or sub-range thereof.

In one embodiment, the first fusion beam entry point 107 is staggered from the second fusion beam entry point 108. In one embodiment, the first fusion beam entry point 107 is located at a weld starting location 401 and the second fusion beam entry point 108 is located distally from the weld starting location 401, proximal to a weld end location 402, thereby defining the weld path 405.

In one embodiment, the second fusion beam entry point 108 is located at the weld starting location 401 and the first fusion beam path 121 is located outside the welded article 110. As the welding process 100 progresses, the first fusion beam path 121 and the second fusion beam path 122 simultaneously, or substantially simultaneously, travel from the weld starting location 401 towards the weld end location 402 along the weld path 405. As the first fusion beam path 121 and the second fusion beam path 122 travel toward the weld end location 402, the first fusion beam path 121 reaches the weld starting location 401 and enters the welded article at the first fusion beam entry point 107. In one embodiment, the first fusion beam path 121 and the second fusion beam path 122 progress independently from the weld starting location 401 to the weld end location 402.

In one embodiment, the first fusion beam path 121 and the second fusion beam path 122 are oriented to extend diagonally through the welded article 110 in an "X" shaped pattern when viewed in a direction perpendicular to the weld path 405. Simultaneously starting the first fusion beam entry point 107 and the second fusion beam entry point 108 at the weld starting end 401 causes the first fusion beam path 121 and the second fusion beam path 122 to intersect. The first fusion beam entry point 107 and the second fusion beam entry point 108 are staggered to prevent the first fusion beam path 121 from contacting the second fusion beam path 122, as the first fusion beam path 121 and the second fusion beam path 122 travel through the first element 101.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A welding process, comprising:
   directing energy from one or more fusion beams to join a first element to a second element and to join the first element to a third element, the first element including a protruding portion extending from between the second element and the third element;
   wherein the directing of the energy is at a first lateral angle and a second lateral angle with respect to the first element;
   wherein each of the one or more fusion beams travels along a fusion beam path extending from an accessible portion to an inaccessible portion, with each of the accessible portion and the inaccessible portion including a joint; and
   wherein the protruding portion is consumed during the directing of the energy.

2. The welding process of claim 1, wherein the first lateral angle is an angle between a surface of the second element and the first fusion beam.

3. The welding process of claim 1, wherein the second lateral angle is an angle between a surface of the third element and the second fusion beam.

4. The welding process of claim 1, wherein the first lateral angle and the second lateral angle are not equal.

5. The welding process of claim 1, wherein the first lateral angle and the second lateral angle are between about 1 degree and about 89 degrees.

6. The welding process of claim 1, wherein the one or more fusion beams is a single defocused laser beam.

7. The welding process of claim 1, wherein the one or more fusion beams includes a first laser beam and a second laser beam.

8. The welding process of claim 1, wherein the one or more fusion beams includes an electron beam.

9. The welding process of claim 1, wherein the one or more fusion beams includes a plasma beam.

10. The welding process of claim 1, wherein the process is automated.

11. The welding process of claim 1, wherein the directing of the energy is to an overlap region.

12. The welding process of claim 11, wherein the overlap region extends into the inaccessible portion.

13. The welding process of claim 11, wherein the overlap region solidifies in a direction from the inaccessible portion to an accessible portion.

14. The welding process of claim 11, wherein fillet welds are formed in the inaccessible portions.

* * * * *